US011712921B2

(12) United States Patent
Mitsuyassu et al.

(10) Patent No.: US 11,712,921 B2
(45) Date of Patent: *Aug. 1, 2023

(54) FABRICATED VEHICLE WHEEL, WHEEL DISC FOR USE IN SUCH A FABRICATED VEHICLE WHEEL AND METHOD FOR PRODUCING SUCH A WHEEL DISC AND FABRICATED VEHICLE WHEEL

(71) Applicant: Maxion Wheels U.S.A. LLC, Novi, MI (US)

(72) Inventors: Fernando Mitsuyassu, Novi, MI (US); Marcio Oliveira, Novi, MI (US)

(73) Assignee: Maxion Wheels U.S.A. LLC, Novi, MI (US)

( * ) Notice: Subject to any disclaimer, the term of this patent is extended or adjusted under 35 U.S.C. 154(b) by 72 days.

This patent is subject to a terminal disclaimer.

(21) Appl. No.: 17/375,475

(22) Filed: Jul. 14, 2021

(65) Prior Publication Data

US 2022/0001690 A1 Jan. 6, 2022

Related U.S. Application Data

(63) Continuation of application No. 16/067,140, filed as application No. PCT/US2016/069117 on Dec. 29, 2016, now Pat. No. 11,084,323.

(Continued)

(51) Int. Cl.
*B60B 3/00* (2006.01)
*B60B 3/04* (2006.01)
(Continued)

(52) U.S. Cl.
CPC .............. *B60B 3/007* (2013.01); *B60B 3/005* (2013.01); *B60B 3/008* (2013.01); *B60B 3/04* (2013.01);
(Continued)

(58) Field of Classification Search
CPC ........... B60B 3/04; B60B 3/041; B60B 3/042; B60B 3/10; B60B 3/12; B60B 3/004;
(Continued)

(56) References Cited

U.S. PATENT DOCUMENTS 7,018,000 B2 3/2006 Alff et al.
7,104,611 B2 9/2006 Alff et al.
(Continued)

FOREIGN PATENT DOCUMENTS

DE 202012104260 U1 2/2014
JP 2005507334 A 3/2005
(Continued)

OTHER PUBLICATIONS

Brazilian Office Action, Application No. BR112018013317-5, dated Nov. 16, 2021.
(Continued)

*Primary Examiner* — Jason R Bellinger
(74) *Attorney, Agent, or Firm* — MacMillan, Sobanski & Todd, LLC (57) ABSTRACT

A wheel disc adapted for use in a fabricated vehicle wheel includes a steel wheel disc defining an axis and includes a center mounting portion, an outer rim connecting flange, a plurality of radially outwardly extending spokes connecting the center mounting portion to the outer rim connecting flange and a ventilation opening provided between each pair of adjacent spokes. A width defined by a center wall of the spoke is tapered inwardly along a substantial portion of a radial length thereof as the center wall of the spoke extends generally from the center mounting portion to the outer rim connecting flange or wherein a width defined by outer walls of the spoke is tapered inwardly along a substantial portion (Continued)

of a radial length thereof as the outer walls of the spoke extends generally from the center mounting portion to the outer rim connecting flange.

17 Claims, 6 Drawing Sheets

Related U.S. Application Data (60) Provisional application No. 62/272,870, filed on Dec. 30, 2015.

(51) Int. Cl.
*B60B 3/10* (2006.01)
*B60B 3/12* (2006.01)

(52) U.S. Cl.
CPC ............... *B60B 3/10* (2013.01); *B60B 3/12* (2013.01); *B60B 2310/202* (2013.01); *B60B 2310/208* (2013.01); *B60B 2360/102* (2013.01); *B60B 2360/104* (2013.01)

(58) Field of Classification Search
CPC ......... B60B 3/007; B60B 3/005; B60B 3/008; B60B 1/08; B60B 1/10
See application file for complete search history.

(56) References Cited

U.S. PATENT DOCUMENTS

| | | | |
|---|---|---|---|
| 7,469,973 B2 | 12/2008 | Coleman et al. | |
| 7,984,551 B2 | 7/2011 | McCorry et al. | |
| 8,454,099 B2 | 6/2013 | Sano et al. | |
| 8,454,100 B2 | 6/2013 | Kihara et al. | |
| 8,596,726 B2 | 12/2013 | Kondo et al. | |
| 9,327,547 B2 | 5/2016 | Morishita et al. | |
| 11,084,323 B2 * | 8/2021 | Mitsuyassu | B60B 3/005 |
| 2005/0017570 A1 | 1/2005 | Alff et al. | |
| 2011/0193404 A1 | 8/2011 | Kihara et al. | |
| 2011/0193405 A1 | 8/2011 | Kihara et al. | |
| 2011/0210602 A1 | 9/2011 | Goto | |
| 2013/0119749 A1 | 5/2013 | Kondo et al. | |
| 2015/0290969 A1 | 10/2015 | Kermelk et al. | |
| 2016/0001592 A1 | 1/2016 | Kermelk et al. | |

FOREIGN PATENT DOCUMENTS

| | | |
|---|---|---|
| JP | 2005509552 A | 4/2005 |
| JP | 2010132277 A | 6/2010 |
| JP | 2012040947 A | 3/2012 |
| WO | 33037651 A1 | 5/2003 |
| WO | 2006096551 A2 | 9/2006 |
| WO | 2012153577 A1 | 11/2012 |
| WO | 2014029600 A1 | 2/2014 |
| WO | 2014132169 A1 | 9/2014 |

OTHER PUBLICATIONS

Japanese Office Action, Application No. 2018-534644, dated Nov. 2, 2020.
China National Intellectual Property Administration. English translation of First Office Action for Chinese application No. 201680080278.1, dated Dec. 22, 2020, pp. 1-9.
India Examination Report, U.S. Appl. No. 201847027712, dated Mar. 12, 2021.
Brazilian Office Action, Application No. BR112018013317-5, dated Aug. 5, 2021.
European Search Report, Application No. 16882642.8, dated Jun. 6, 2019.

* cited by examiner

FABRICATED VEHICLE WHEEL, WHEEL DISC FOR USE IN SUCH A FABRICATED VEHICLE WHEEL AND METHOD FOR PRODUCING SUCH A WHEEL DISC AND FABRICATED VEHICLE WHEEL

CROSS-REFERENCE TO RELATED APPLICATIONS

This application is a continuation of U.S. Ser. No. 16/067,140, filed Jun. 29, 2018, now U.S. Pat. No. 11,084,323, issued Aug. 10, 2021, the disclosures of which are incorporated herein by reference in entirety, which is a national stage of International Application No. PCT/US16/069,117, filed Dec. 29, 2016, the disclosures of which are incorporated herein by reference in entirety, and which claimed priority to U.S. Provisional Patent Application No. 62/272,870, filed Dec. 30, 2015, the disclosures of which are incorporated herein by reference in entirety.

BACKGROUND OF THE INVENTION

The present invention relates generally to a fabricated vehicle wheel and in particular to an improved fabricated vehicle wheel, wheel disc for use in such a fabricated vehicle wheel and method for producing such a wheel disc and fabricated vehicle wheel.

A conventional fabricated vehicle wheel is typically of a two-piece construction and includes an inner disc and an outer "full" rim. The disc can be cast, forged, or fabricated from steel, aluminum, or other alloys, and includes an inner annular wheel mounting portion and an outer annular portion. The wheel mounting portion defines an inboard mounting surface or pad and includes a center pilot or hub hole, and a plurality of lug receiving holes formed therethrough for mounting the wheel to an axle of the vehicle. The rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the disc is used. In both types of constructions, the outer annular portion of the disc is typically secured to the rim by welding.

SUMMARY OF THE INVENTION

The present invention relates to an improved fabricated vehicle wheel and method for producing such a fabricated vehicle wheel substantially as illustrated and/or described herein.

According to one embodiment, the wheel disc for use in a fabricated vehicle wheel and/or method for producing the same may comprise, individually and/or in combination, one or more of the following features and/or elements: a steel wheel disc defining an axis and including a center mounting portion, an outer rim connecting flange, a plurality of radially outwardly extending spokes connecting the center mounting portion to the outer rim connecting flange and a ventilation opening provided between each pair of adjacent spokes, the center mounting pad including a center hub hole and a plurality of lug bolt mounting holes, the outer rim connecting flange parallel to the axis and including a side edge, each of the spokes including a center wall, a generally axially outwardly side wall extending from each end of the center wall, and a bent back outwardly extending outer wall extending from each of the side walls, and the ventilation opening being defined by the side edge of the outer rim connecting flange and the outer walls of adjacent pairs of spoke; wherein a width defined by the center wall of the spoke is tapered inwardly along a substantial portion of a radial length thereof as the center wall of the spoke extends generally from the center mounting portion to the outer rim connecting flange or wherein a width defined by the outer walls of the spoke is tapered inwardly along a substantial portion of a radial length thereof as the outer walls of the spoke extends generally from the center mounting portion to the outer rim connecting flange.

According to this embodiment, the ventilation opening has a center hole which is defined by three radii.

According to this embodiment, the ventilation opening has concave angle along the portion defined by the outer wall of an adjacent pair of spokes.

According to this embodiment, the center wall of the spoke is generally concave.

According to this embodiment, the center mounting portion includes a mounting pad defined at a backside of each of the lug bolt holes, the mounting pad having a pair of side walls tapered radially outwardly for a substantial portion thereof relative to one another at each lug bolt hole to define at the hub hole a first angular distance, and a pair of adjacent side walls between an adjacent pair of lug bolt holes are tapered radially outwardly to define at the hub hole a second angular distance, wherein the first and second angular distances are generally equal to one another or the first and second distances are slightly different than one another.

According to this embodiment, the center mounting portion includes a rib disposed between each pair of adjacent lug bolt holes, the rib having a generally flat wall portion for a substantial portion thereof as the wall portion extends radially outwardly from the center hub hole.

According to this embodiment, the number of the spokes and the lug bolt holes is the same number and each of the spokes is aligned with a respective one of the lug bolt holes.

According to another embodiment, a fabricated vehicle wheel and/or method for producing the same may comprise, individually and/or in combination, one or more of the following features and/or elements: a wheel rim; and a steel wheel disc secured to the wheel rim and defining an axis, the wheel disc including a center mounting portion, an outer rim connecting flange, a plurality of radially outwardly extending spokes connecting the center mounting portion to the outer rim connecting flange and a ventilation opening provided between each pair of adjacent spokes, the center mounting portion including a center hub hole and a plurality of lug bolt mounting holes, the outer rim connecting flange parallel to the axis and including a side edge, each of the spokes including a center wall, a generally axially outwardly side wall extending from each end of the center wall, and a bent back outwardly extending outer wall extending from each of the side walls, and the ventilation opening being defined by the side edge of the outer rim connecting flange and the outer walls of adjacent pairs of spokes; wherein a width defined by the center wall of the spoke is tapered inwardly along a substantial portion of a radial length thereof as the center wall of the spoke extends generally from the center mounting pad to the outer rim connecting flange or wherein a width defined by the outer walls of the spoke is tapered inwardly along a substantial portion of a radial length thereof as the outer walls of the spoke extends generally from the center mounting portion to the outer rim connecting flange.

According to this embodiment, the ventilation opening has a center hole which is defined by three radii.

According to this embodiment, the ventilation opening has concave angle along the portion defined by the outer wall of an adjacent pair of spokes.

According to this embodiment, the center wall of the spoke is generally concave.

According to this embodiment, the center mounting portion includes a mounting pad defined at a backside of each of the lug bolt holes, the mounting pad having a pair of side walls tapered radially outwardly for a substantial portion thereof relative to one another at each lug bolt hole 124 to define at the hub hole a first angular distance, and a pair of adjacent side walls between an adjacent pair of lug bolt holes are tapered radially outwardly to define at the hub hole a second angular distance, wherein the first and second angular distances are generally equal to one another or the first and second distances are slightly different than one another.

According to this embodiment, the center mounting portion includes a rib disposed between each pair of adjacent lug bolt holes, the rib having a generally flat wall portion for a substantial portion thereof as the wall portion extends radially outwardly from the center hub hole.

According to this embodiment, the number of the spokes and the lug bolt holes is the same number and each of the spokes is aligned with a respective one of the lug bolt holes.

According to this embodiment, the wheel rim is formed from steel and the wheel disc is secured to the wheel rim by welding.

According to yet another embodiment, a fabricated vehicle wheel and/or method for producing the same may comprise, individually and/or in combination, one or more of the following features and/or elements: a wheel rim; and a steel wheel disc secured to the wheel rim and defining an axis, the wheel disc including a center mounting portion, an outer rim connecting flange, a plurality of radially outwardly extending spokes connecting the center mounting portion to the outer rim connecting flange and a ventilation opening provided between each pair of adjacent spokes, the center mounting portion including a center hub hole and a plurality of lug bolt mounting holes, the outer rim connecting flange parallel to the axis and including a side edge, each of the spokes including a center wall, a generally axially outwardly side wall extending from each end of the center wall, and a bent back outwardly extending outer wall extending from each of the side walls, and the ventilation opening being defined by the side edge of the outer rim connecting flange and the outer walls of adjacent pairs of spokes; wherein the center wall of the spoke is generally concave and wherein the ventilation opening has concave angle along the portion defined by the outer wall of an adjacent pair of spokes.

According to this embodiment, a width defined by the center wall of the spoke is tapered inwardly along a substantial portion of a radial length thereof as the center wall of the spoke extends generally from the center mounting portion to the outer rim connecting flange or wherein a width defined by the outer walls of the spoke is tapered inwardly along a substantial portion of a radial length thereof as the outer walls of the spoke extends generally from the center mounting portion to the outer rim connecting flange.

According to this embodiment, the ventilation opening has a center hole which is defined by three radii.

According to this embodiment, the center mounting portion includes a mounting pad defined at a backside of each of the lug bolt holes, the mounting pad having a pair of side walls tapered radially outwardly for a substantial portion thereof relative to one another at each lug bolt hole 124 to define at the hub hole a first angular distance, and a pair of adjacent side walls between an adjacent pair of lug bolt holes are tapered radially outwardly to define at the hub hole a second angular distance, wherein the first and second angular distances are generally equal to one another or the first and second distances are slightly different than one another.

According to this embodiment, the center mounting portion includes a rib disposed between each pair of adjacent lug bolt holes, the rib having a generally flat wall portion for a substantial portion thereof as the wall portion extends radially outwardly from the center hub hole.

According to this embodiment, the number of the spokes and the lug bolt holes is the same number and each of the spokes is aligned with a respective one of the lug bolt holes.

According to this embodiment, the wheel rim is formed from steel and the wheel disc is secured to the wheel rim by welding.

Other advantages of this invention will become apparent to those skilled in the art from the following detailed description of the invention and preferred embodiments, when read in light of the accompanying drawings.

DETAILED DESCRIPTION OF THE INVENTION

Figure 1A:
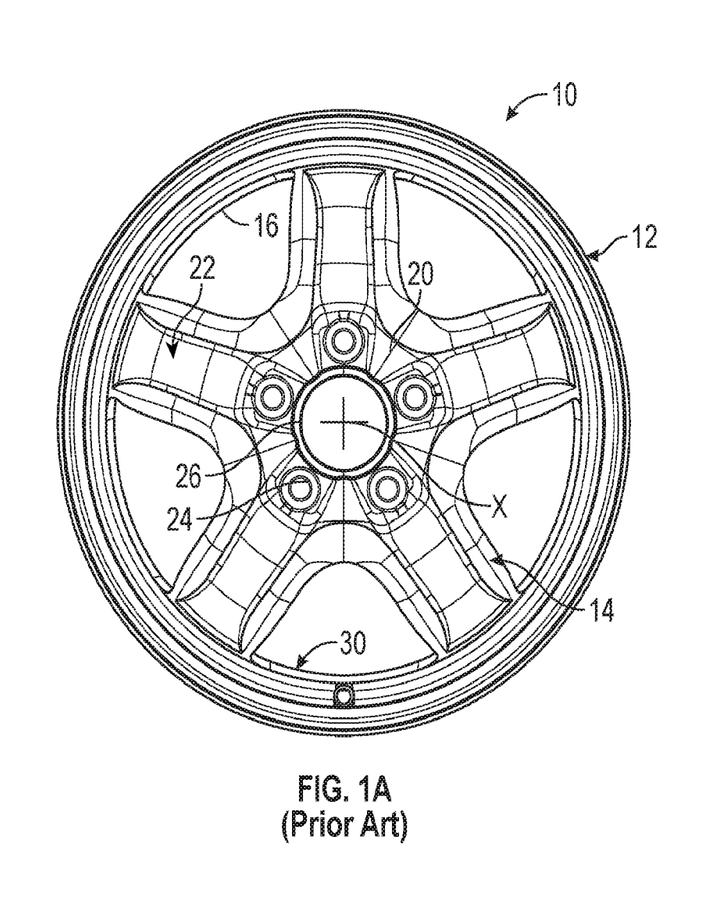
FIG. 1A is a front view of an embodiment of a conventional fabricated steel vehicle wheel.

Referring now to the drawings, there is illustrated in FIG. 1A a conventional fabricated steel vehicle wheel, indicated generally at 10, which includes a rim 12 and a disc 14 secured together by suitable means, such as for example welding. In the illustrated embodiment, the prior art vehicle wheel 10 defines a wheel axis X and is illustrated as being a bead seat attached vehicle wheel. The vehicle wheel 10 includes a generally axially extending outer "rim connecting" flange 16 which is configured to be disposed adjacent an inner surface of the rim 12 and secured thereto by welding. The vehicle wheel 10 may be similar to that disclosed in one or more of U.S. Pat. No. 7,984,551 to McCorry et al., U.S. Pat. No. 7,587,825 to Coleman et al., U.S. Pat. No. 7,559,145 to Jäcke et al., and U.S. Pat. No. 7,059,685 to Kermelk et al., the disclosures of each of the patents incorporated herein by reference in entirety. The disc 14 includes a center mounting portion 20, a plurality of radially outwardly extending spokes 22 and the outer flange 16. The center mounting portion 20 of the disc 14 further includes a plurality of lug bolt holes 24 and a center hub hole 26. The vehicle wheel 10 includes ventilation openings 30 provided between each pair of spokes 22.

Figure 2A:
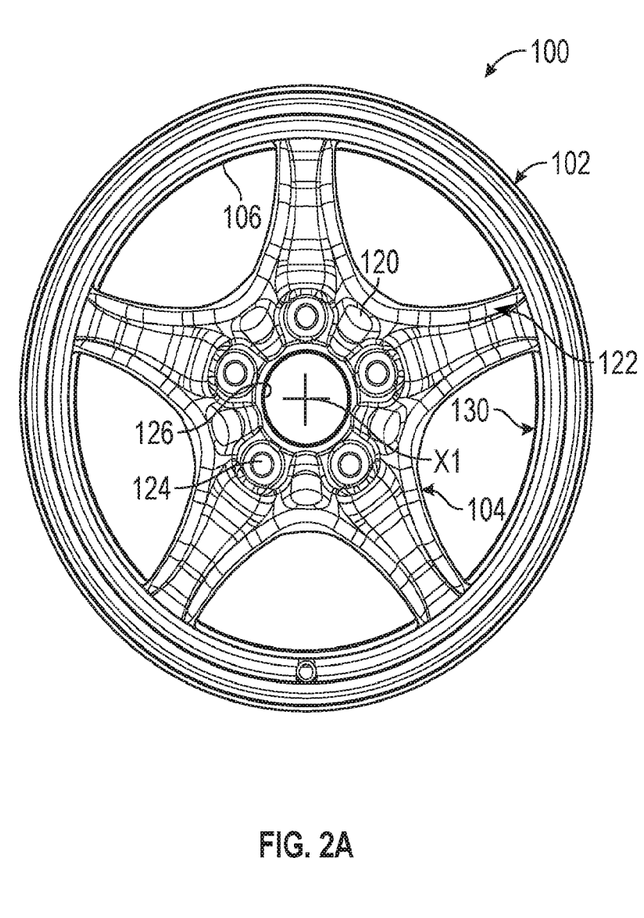
FIG. 2A is a front view of an embodiment of an improved fabricated steel vehicle wheel in accordance with the present invention.

FIG. 2A illustrates an embodiment of a fabricated steel vehicle wheel, indicated generally at 100, in accordance with the present invention. As shown therein the vehicle wheel which includes a rim 102 and a disc 104 secured together by suitable means, such as for example welding. In the illustrated embodiment, the prior art vehicle wheel 100 defines a wheel axis X1 and is illustrated as being a bead seat attached vehicle wheel. The vehicle wheel 100 includes a generally axially extending outer "rim connecting" flange 106 which is configured to be disposed adjacent an inner surface of the rim 102 and secured thereto by welding. The disc 104 includes a center mounting portion 120, a plurality of radially outwardly extending spokes 122 and the outer flange 106. The center mounting portion 120 of the disc 104 further includes a plurality of lug bolt holes 124 and a center hub hole 126. The vehicle wheel 10 includes ventilation openings 130 provided between each pair of spokes 122.

Figure 1B:
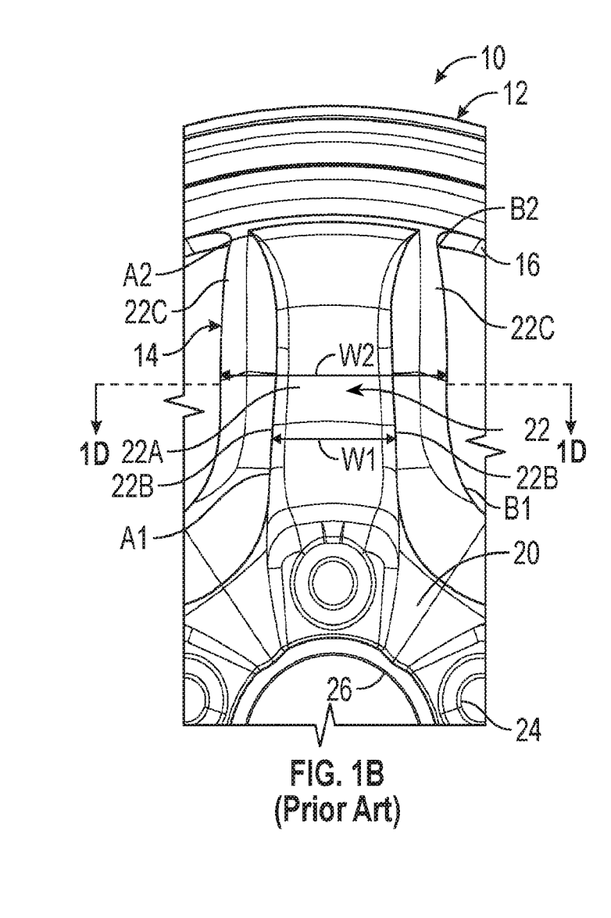
FIGS. 1B-1F are selected views of the conventional fabricated steel vehicle wheel as illustrated in FIG. 1A.
Figure 1D:
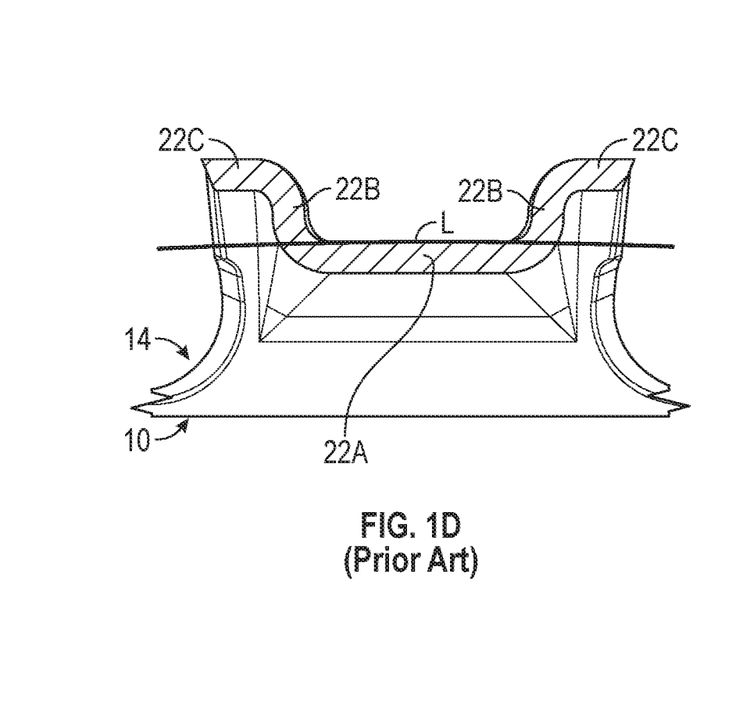
Figure 2B:
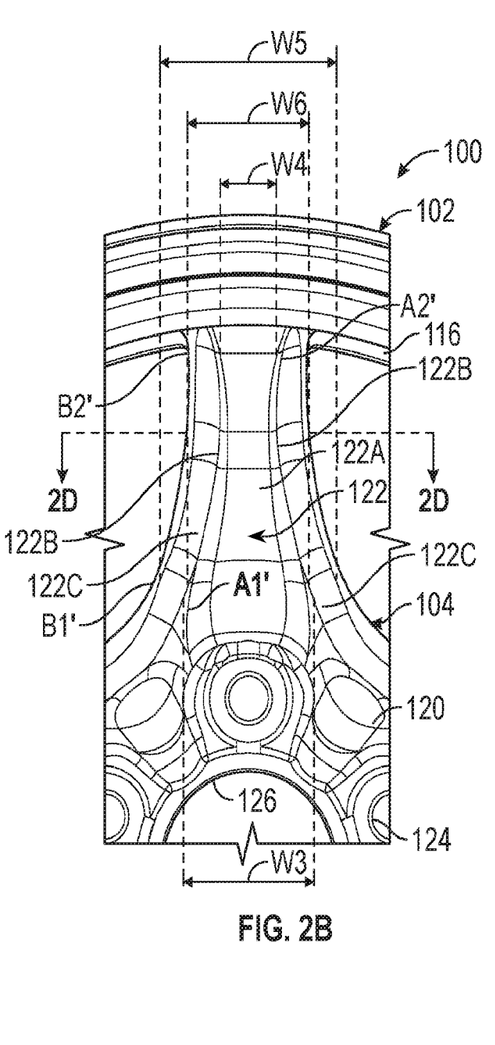
FIGS. 2B-2F are selected views of the improved fabricated steel vehicle wheel in accordance with the present invention as illustrated in FIG. 2A.

Referring now to FIGS. 1B and 2B, FIG. 1B shows the geometry of a spoke 22 of the disc 14 of the conventional fabricated steel vehicle wheel 10 whereas FIG. 2B shows the geometry of a spoke 122 of the disc 104 of the improved fabricated steel vehicle wheel 100. As show in FIG. 1B and best shown in FIG. 1D, the spoke 22 has generally flat or planar central wall or portion 22A, a generally axially outwardly side wall 22B extending from each end of the central wall 22A, and a generally bent back outwardly extending front or outer wall 22C extending from each of the side walls 22B. As can be seen best in FIG. 1D, the central wall 22A and the outer walls 22C extend substantially parallel to each other and substantially perpendicular relative to the side walls 22B.

As illustrated in FIG. 1B, a width W1 of the central wall 22A only slightly narrows or is reduced along a substantial and/or an entire portion thereof as the wall 22A extends radially outwardly generally from a point A1 near or adjacent to the center mounting portion 20 to a point A2 near or adjacent to the outer flange 16. Similarly, a width W2 of the outer walls 22C only slightly narrows or is reduced along a substantial and/or an entire portion thereof as the walls 22B extend radially outwardly generally from a point B1 near or adjacent to the center mounting portion 20 to a point B2 near or adjacent to the outer flange 16. The narrowing of the associated walls 22A and 22B is in the range from about 2% to about 5%. As can be seen, the width W1 only slightly increases at an outermost end portion thereof where it merges with the outer flange 16.

Figure 2C:
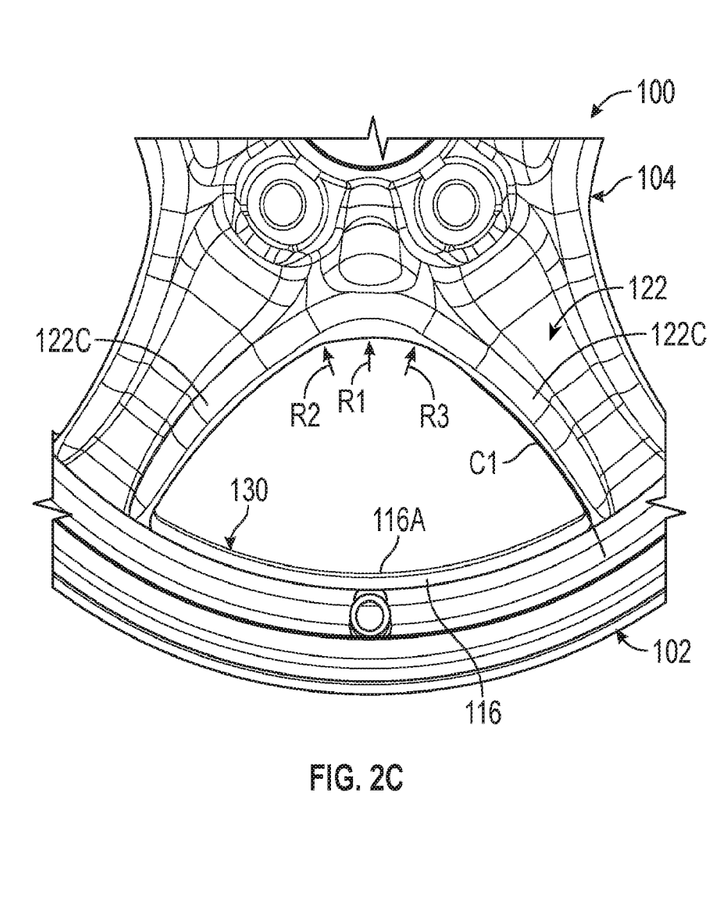
Figure 2D:
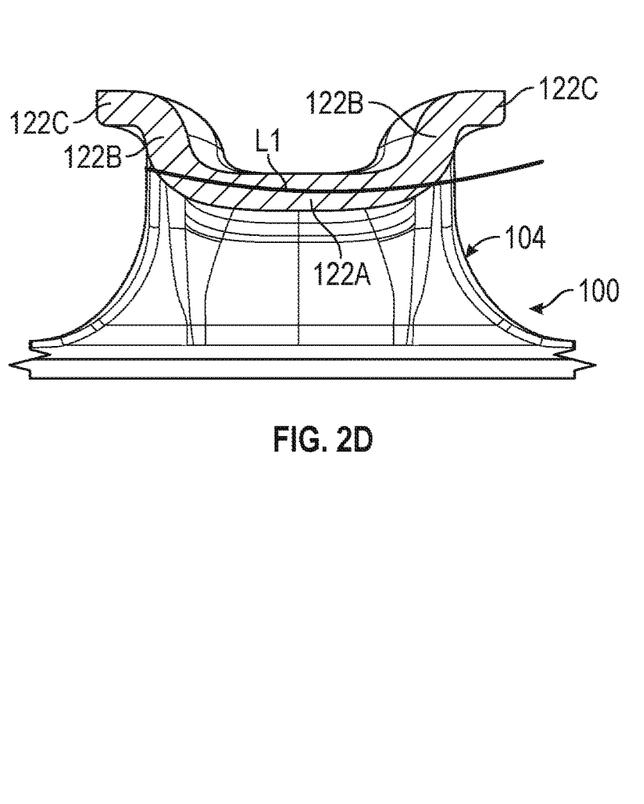

As show in the embodiment of the invention illustrated in FIG. 2B and best shown in FIG. 2D, the spoke 122 has generally flat or planar central wall or portion 122A, a generally axially outwardly side wall 122B extending from each end of the central wall 122A, and a generally bent back outwardly extending front or outer wall 122C extending from each of the side walls 122B. As can be seen best in FIG. 2D, the central wall 122A and the outer walls 122C extend generally parallel to each other and generally perpendicular relative to the side walls 122B. The particular detailed construction and/or orientation of the walls 122A-122C of the spoke 122 will be discussed below in detail in connection with FIG. 2D.

As illustrated in FIG. 2B, a width of the central wall 122A as well as a width the outer walls 122C considerably narrows or is reduced along a substantial and/or an entire portion thereof as the associated walls 122A and 122B extend radially outwardly generally from the center mounting portion 120 to the outer flange 116. In particular, the central wall 122A has a first width W3 at a point A1' generally near or adjacent to the center mounting portion 120 and a second width W4 at a point A2' generally near or adjacent to the outer flange 116 which is considerably less that the first width W3. The difference can be preferably at least 10% less and can be in the range from about 10% less to about 50% less. More preferably the difference is in the range of about 15% less to about 35% less.

Similarly, the outer walls 122C have a first width W5 at a point B1' generally near or adjacent to the center mounting portion 120 and a second width W6 at a point B2' generally near or adjacent to the outer flange 116 which is considerably less that the first width W5. The difference is preferably at least 10% less and more preferably can be in the range from about 10% less to about 50% less. More preferably the difference is in the range of about 15% less to about 35% less. As can be seen, the width of the central part 122A only slightly increases at an outermost end portion thereof where it merges with the outer flange 116. One or more potential and/or realized advantages or features of the illustrated and described geometry of the "new" spoke 122 compared to the geometry of the conventional spoke 22 may be an improved stress distribution and optimized disc 104 performance (e.g., when considering the same cornering and radial loads the disc 104 works or operates like a system rather than individual parts). Also, the geometry of the spoke 122 can result in a weight reduction of the associated disc 104 and/or result in the disc 104 having larger ventilation openings 130 compared to the ventilation openings 30 of a similar sized prior art disc 14. Alternatively, the configuration, construction, structure, material and/or shape of the spoke 122 of the vehicle wheel 100, may be other than illustrated and described, if so desired. For example, only one of the center wall 122A or the outer walls 122C may be reduced in width at least along a substantial portion thereof as they extend radially outwardly.

Figure 1C:
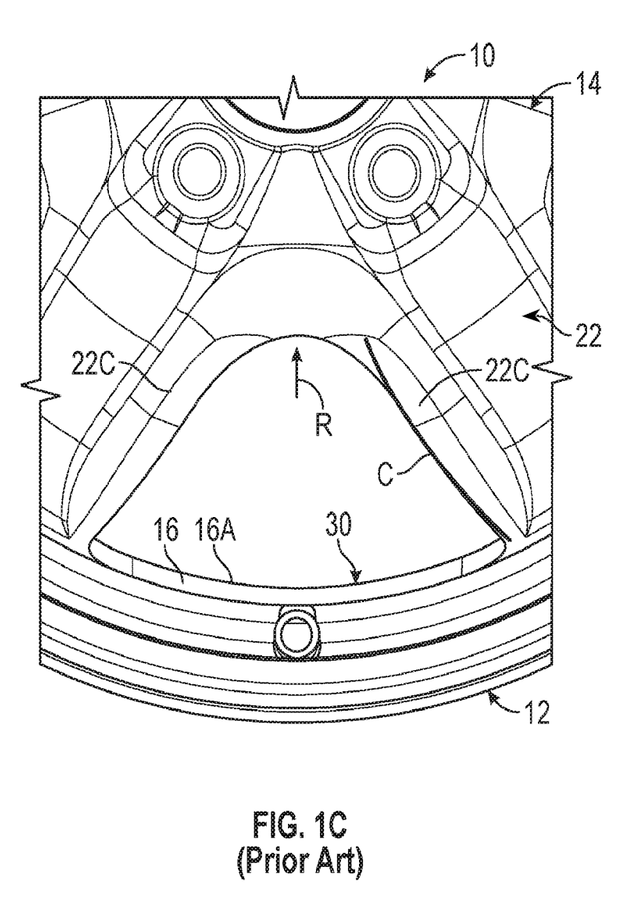

Referring now to FIGS. 1C and 2C, FIG. 1C shows the geometry of the ventilation opening 30 of the disc 14 of the conventional fabricated steel vehicle wheel 10 whereas FIG. 2C shows the geometry of the ventilation opening 130 of the disc 104 of the improved fabricated steel vehicle wheel 100. As shown in FIG. 1C, the ventilation opening 30 is defined by a side edge 16A of the outer flange 16 and the outer walls 22C of an adjacent pair of spokes 22. As can be seen, the ventilation opening 30 has a single center hole radius R and the side walls of the ventilation opening 30 is defined by the outer walls 22C of the spokes 22 and has a convex angle C (as shown by the bold line in FIG. 1C.

As shown in FIG. 2C, the ventilation opening 130 is defined by a side edge 116A of the outer flange 116 and the outer walls 122C of an adjacent pair of spokes 122. As can be seen, the ventilation opening 130 has is defined by three center hole radii R1, R2 and R3 and the side walls of the ventilation opening 130 is defined by the outer walls 122C of the spokes 122 and has a concave angle C1 (as shown by the bold line in FIG. 1C. In the illustrated embodiment the radii R2 and R3 are the same. One or more potential and/or realized advantages or features of the geometry of the "new" ventilation opening 130 compared to the geometry of the conventional ventilation opening 30 may be by increasing the center ventilation opening radius from R1 to R1-R3 in FIGS. 1C and 2C, respectively, the associated three angles makes a smoother region to reduce stress concentration in the associate portion of the vehicle wheel 100. Also, by changing the spoke sides from a convex angle C in the conventional ventilation opening 30 to a concave angle C1 in the ventilation opening 130, as shown in FIGS. 1C and 2C, respectively, an improved load distribution in the associated vehicle wheel 100 may be achieved.

Referring now to FIGS. 1D and 2D, FIG. 1D shows the center geometry of the spoke 14A of the disc 14 of the conventional fabricated steel vehicle wheel 10 taken along line 1D-1D of FIG. 1d whereas FIG. 2D shows the center geometry of the spoke 24A of the disc 24 of the improved fabricated steel vehicle wheel 20 taken along line 2D-2D of FIG. 2d. As can be seen in FIG. 1D, the geometry of the center wall 22A of the spoke 22 of the conventional wheel 10 is essentially flat or only very slightly convex as illustrated by the bold line L.

As can be seen in FIG. 2D, the geometry of the center wall 122A of the spoke 122 of the vehicle wheel 100 is generally concave as illustrated by the bold line L1. One or more potential and/or realized advantages or features of the center wall geometry of the "new" spoke 122 compared to the center wall geometry of the conventional spoke 22 is that by changing the spoke center geometry from a generally flat region, illustrated by the line L in FIG. 1D, to a concave region, illustrated by line L1 in FIG. 2D, it may be possible to maintain the same spoke stiffness considering that the associated new spoke width (i.e., W3-W4), has been reduced compared to the conventional spoke width (i.e., W1). Also, it may be possible to improve stress distribution due to the new center wall geometry by reducing the "hot spots" magnitude at the associated side radii at the "curved" transition from the center wall 122A to the associated side walls 122B of the spoke 122.

Figure 1E:
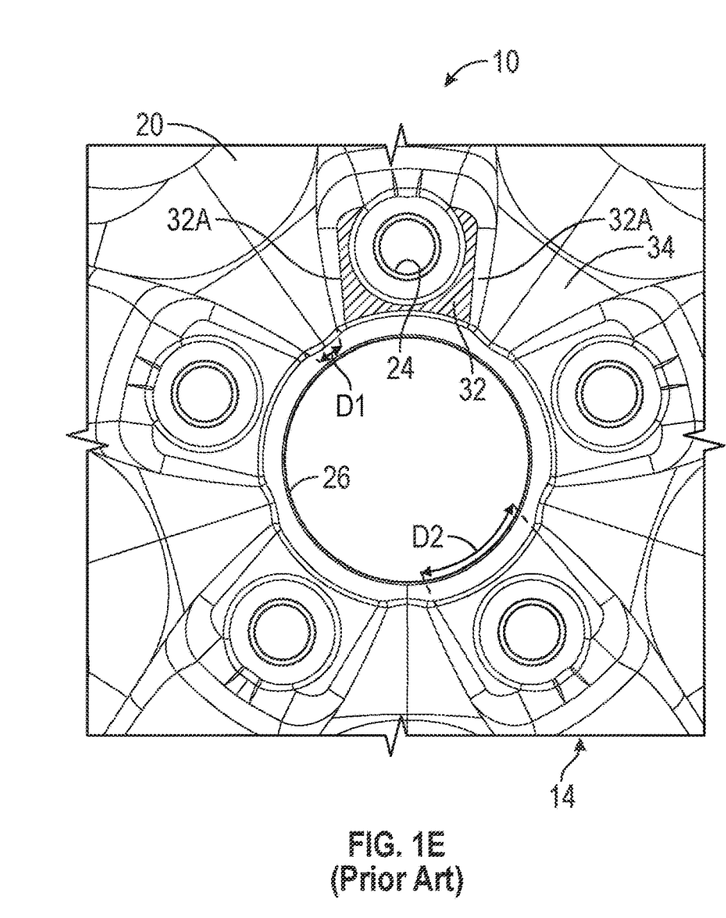
Figure 2E:
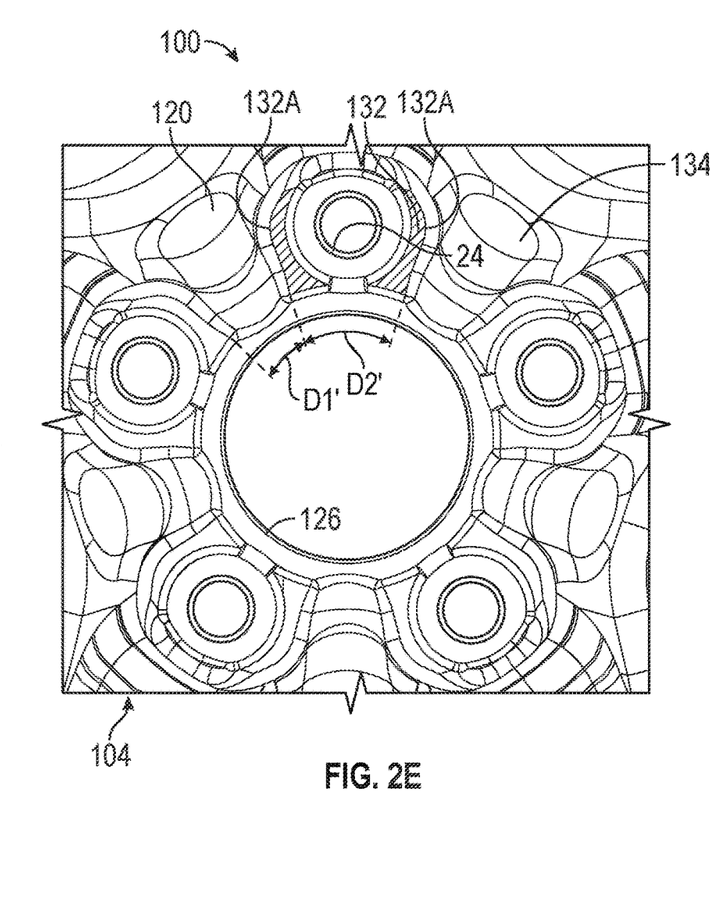

Referring now to FIGS. 1E and 2E, FIG. 1E shows the geometry of a center mounting portion 20 of the disc 14 of the conventional fabricated steel vehicle wheel 10 whereas FIG. 2E shows the geometry of a center mounting portion 120 of the disc 104 of the improved fabricated steel vehicle wheel 100. As can be seen in FIG. 1E, the center mounting portion 20 includes a mounting pad or surface 32 (illustrated in FIG. 1E by cross-hatching for discussion purposes), having the geometry illustrated therein defined at a backside of each of the lug bolt holes 24 and a "strengthening" rib 34 having the geometry illustrated therein provided between each pair of adjacent lug bolt holes 24. In particular, the mounting pad 32 includes a pair of side walls 32A which extend essentially parallel to one another at each a lug bolt hole 24 to define at the hub hole 26 an angular distance D2. A pair of adjacent side walls 32A between an adjacent pair of lug bolt holes 24 are tapered radially outwardly relative to the wheel axis X to define at the hub hole 26 an angular distance D1. As can be seen, the angular distance D2 is substantially greater than the angular distance D1. In particular, the angular distance D2 is approximately 8 to 15 times greater than the angular distance D1 at the hub hole portion of the disc 14.

As can be seen in FIG. 2E, the center mounting pad 120 includes a mounting pad or surface 132 (illustrated in FIG. 1E by cross-hatching for discussion purposes), having the geometry illustrated therein defined at each of the lug bolt holes 124 and a "strengthening" rib 134 having the geometry illustrated therein provided between each pair of adjacent lug bolt holes 124. In particular, the mounting pad 132 includes a pair of side walls 132A which are essentially tapered radially outwardly for a substantial portion relative to one another at each lug bolt hole 124 to define at the hub hole 26 an angular distance D2'. A pair of adjacent side walls 132A between an adjacent pair of lug bolt holes 24 extend generally parallel to one another with only a small radially outwardly taper relative to the wheel axis X1 to define at the hub hole 126 an angular distance D1'. As can be seen, the angular distance D2' is slightly larger than the angular distance D1'; however, the angular distances D1' and D2' may be other than illustrated if so desired. For example, the distances D1' and D2' may be generally equal to one another or the angular distance D2' may be slightly less than the angular distance D1'. One or more potential and/or realized advantages or features of the geometry of the "new" center mounting portion 20 compared to the geometry of the conventional center mounting portion 20 is that an increase in region stiffness may be achieved and also more space is provided at the rib 134 between adjacent pairs of lug bolt holes 124 to enable better rib conformity.

Figure 1F:
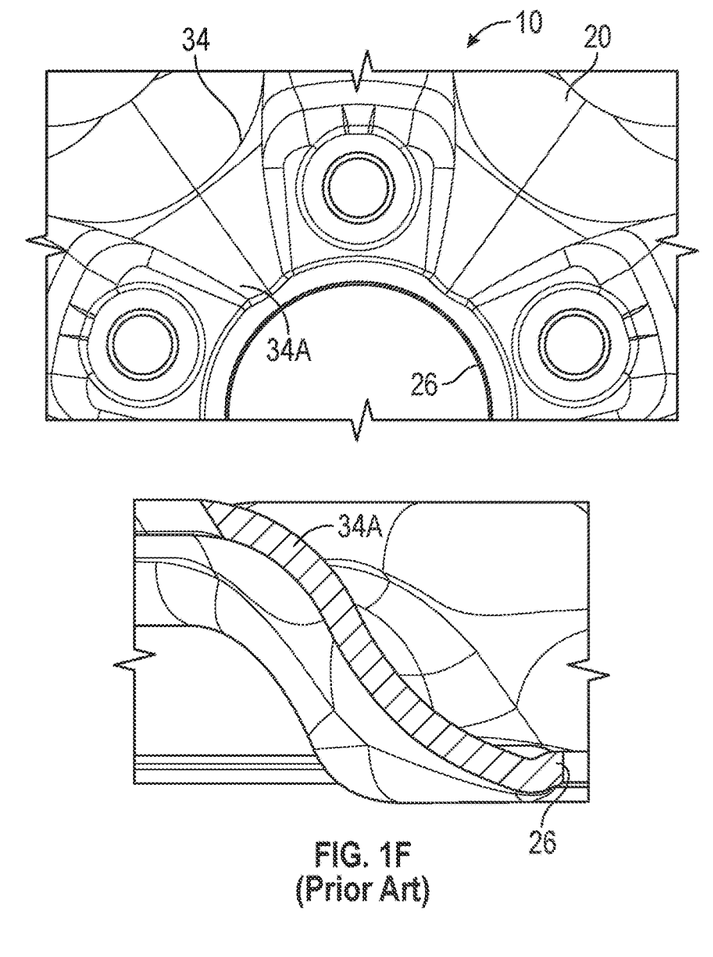
Figure 2F:
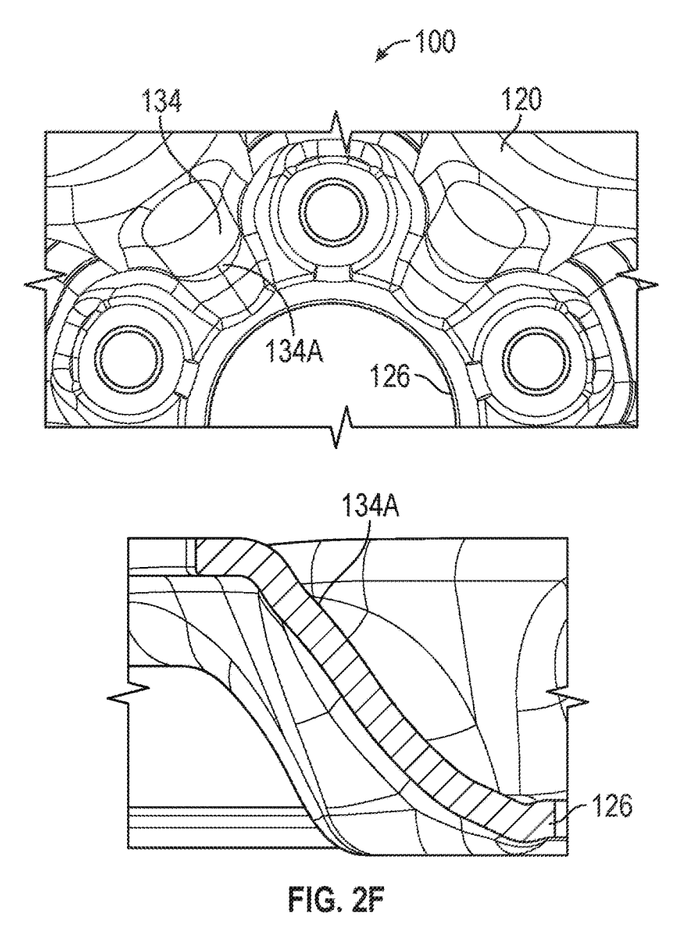

Referring now to FIGS. 1F and 2F, FIG. 1F shows two views of the geometry of the rib 34 of the disc 14 of the conventional fabricated steel vehicle wheel 10 whereas FIG. 2F shows two views of the geometry of the rib 134 of the disc 104 of the improved fabricated steel vehicle wheel 100. As can be seen in FIG. 1F, the rib 34 has a generally curved wall portion 34A as it rises up or extends radially outwardly from the hub hole 26. As can be seen in FIG. 2F, the rib 134 has a generally flat or planar wall portion 134A for a substantial portion thereof as it rises up or extends radially outwardly from the hub hole 126. One or more potential and/or realized advantages or features of the geometry of the rib 134 of the vehicle wheel 100 compared to the geometry of the conventional rib 34 is that the associated new geometry of the rib 134 may increase the stiffness and allow for improved stress reduction in the associated vehicle wheel compared to the conventional rib geometry.

Alternatively, the configuration, construction, structure, material, manufacture and/or shape of the vehicle wheel 100, including that of the rim 102 and/or the disc 104, may be other than illustrated and described, if so desired. In addition the disc 104 may only include at least one or more of the features and/or elements illustrated and described above in connection with at least one or more of the FIGS. 2A-2F.

The principle and mode of operation of this invention have been described in its various embodiments. However, it should be noted that this invention may be practiced otherwise than as specifically illustrated and described without departing from its scope.

What is claimed is:

1. A wheel disc adapted for use in a fabricated vehicle wheel comprising:
   a steel wheel disc defining an axis and including a center mounting portion, an outer rim connecting flange, a plurality of radially outwardly extending spokes connecting the center mounting portion to the outer rim connecting flange and a ventilation opening provided between each pair of adjacent spokes, the center mounting portion including a center hub hole and a plurality of lug bolt mounting holes, the outer rim connecting flange parallel to the axis and including a side edge, each of the spokes including a center wall, a generally axially outwardly side wall extending from each end of the center wall, and a bent back outwardly extending outer wall extending from each of the side walls, and the ventilation opening being defined by the side edge of the outer rim connecting flange and the outer walls of adjacent pairs of spoke;
   wherein a width of the center wall and a width of the outer walls narrows or is reduced along a substantial and/or an entire portion thereof as the center and outer walls extend radially outwardly generally from the center mounting portion to the outer flange such that the center wall has a first width at a point generally proximate to the center mounting portion and a second width at a point generally proximate to the outer flange which is less that the first width, and the outer walls have a third width at a point generally proximate to the center mounting portion and a fourth width at a point generally proximate to the outer flange which is less that the third width, wherein the ventilation opening is defined by an inner center hole, a pair of side walls extending outwardly from the inner center hole, and an outer side edge defined by the outer flange of the disc, wherein the inner center hole is defined by three center hole radii.

2. The wheel disc of claim 1 wherein the difference between the second width and the first width is at least 10%, and the difference between the fourth width and the third width is at least 10%.

3. The wheel disc of claim 1 wherein the difference between the second width and the first width is in the range of from 10% to 50%, and the difference between the fourth width and the third width is in the range of from 10% to 50%.

4. The wheel disc of claim 1 wherein the ventilation opening has a concave angle along a portion defined by the outer wall of an adjacent pair of spokes.

5. The wheel disc of claim 1 wherein the center wall of the spoke is generally concave as the center wall extends across the width thereof.

6. The wheel disc of claim 1 wherein the center mounting portion includes a rib disposed between each pair of adjacent lug bolt holes, the rib having a generally flat wall portion for a substantial portion thereof as the wall portion extends radially outwardly from the center hub hole.

7. The wheel disc of claim 1 wherein the number of the spokes and the lug bolt holes is the same number and each of the spokes is aligned with a respective one of the lug bolt holes.

8. The wheel disc of claim 1 wherein the center mounting portion includes a mounting pad defined at a backside of each of the lug bolt holes, the mounting pad having a pair of side walls tapered radially outwardly for a substantial portion thereof relative to one another at each lug bolt hole to define at the hub hole a first angular distance, and a pair of adjacent side walls between an adjacent pair of lug bolt holes which extend with a radially outwardly taper relative to one another to define at the hub hole a second angular distance, wherein the first and second angular distances are generally equal to one another or the first and second distances are different than one another.

9. A fabricated vehicle wheel comprising:
a wheel rim formed from a suitable material;
a steel wheel disc adapted to be secured to the wheel rim and defining an axis and including a center mounting portion, an outer rim connecting flange, a plurality of radially outwardly extending spokes connecting the center mounting portion to the outer rim connecting flange and a ventilation opening provided between each pair of adjacent spokes, the center mounting portion including a center hub hole and a plurality of lug bolt mounting holes, the outer rim connecting flange parallel to the axis and including a side edge, each of the spokes including a center wall, a generally axially outwardly side wall extending from each end of the center wall, and a bent back outwardly extending outer wall extending from each of the side walls, and the ventilation opening being defined by the side edge of the outer rim connecting flange and the outer walls of adjacent pairs of spokes;
wherein a width of the center wall and a width of the outer walls narrows or is reduced along a substantial and/or an entire portion thereof as the center and outer walls extend radially outwardly generally from the center mounting portion to the outer flange such that the center wall has a first width at a point generally proximate to the center mounting portion and a second width at a point generally proximate to the outer flange which is less that the first width, and the outer walls have a third width at a point generally proximate to the center mounting portion and a fourth width at a point generally proximate to the outer flange which is less that the third width, wherein the ventilation opening is defined by an inner center hole, a pair of side walls extending outwardly from the inner center hole, and an outer side edge defined by the outer flange of the disc, wherein the inner center hole is defined by three center hole radii.

10. The fabricated vehicle wheel of claim 9 wherein the difference between the second width and the first width is at least 10%, and the difference between the fourth width and the third width is at least 10%.

11. The fabricated vehicle wheel of claim 9 wherein the difference between the second width and the first width is in the range of from 10% to 50%, and the difference between the fourth width and the third width is in the range of from 10% to 50%.

12. The fabricated vehicle wheel of claim 9 wherein the ventilation opening has a concave angle along a portion defined by the outer wall of an adjacent pair of spokes.

13. The wheel disc of claim 9 wherein the center wall of the spoke is generally concave as the center wall extends across the width thereof.

14. The fabricated vehicle wheel of claim 9 wherein the center mounting portion includes a rib disposed between each pair of adjacent lug bolt holes, the rib having a generally flat wall portion for a substantial portion thereof as the wall portion extends radially outwardly from the center hub hole.

15. The fabricated vehicle wheel of claim 9 wherein the number of the spokes and the lug bolt holes is the same number and each of the spokes is aligned with a respective one of the lug bolt holes.

16. The fabricated vehicle wheel of claim 9 wherein the center mounting portion includes a mounting pad defined at a backside of each of the lug bolt holes, the mounting pad having a pair of side walls tapered radially outwardly for a substantial portion thereof relative to one another at each lug bolt hole to define at the hub hole a first angular distance, and a pair of adjacent side walls between an adjacent pair of lug bolt holes which extend with a radially outwardly taper relative to one another to define at the hub hole a second angular distance, wherein the first and second angular distances are generally equal to one another or the first and second distances are different than one another.

17. The fabricated vehicle wheel of claim 9 wherein the wheel rim is formed from steel and the wheel disc is secured to the wheel rim by welding.

* * * * *